Figure 1:
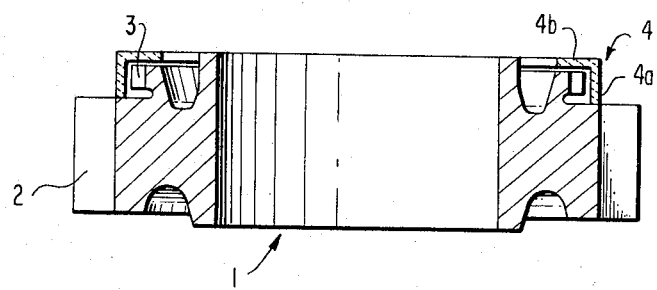

United States Patent [19]
Ritzka

[11] 3,873,376
[45] Mar. 25, 1975

[54] METHOD FOR CASE HARDENING WORKPIECES
[75] Inventor: Karl Ritzka, Karlsruhe, Germany
[73] Assignee: Daimler-Benz Aktiengesellschaft, Stuttgart, Germany
[22] Filed: Feb. 16, 1973
[21] Appl. No.: 333,199

[30] Foreign Application Priority Data
Feb. 16, 1972 Germany.............................. 2207148

[52] U.S. Cl................. 148/16.5, 118/504, 148/20.3
[51] Int. Cl... C23c 11/10, C23c 11/12, B05b 15/04
[58] Field of Search .......... 148/15.5, 16.5, 19, 31.5, 148/39, 187, 20.3; 117/5.5, 40, 105.2, 129, 130; 106/39, 52; 118/504

[56] References Cited
UNITED STATES PATENTS
| | | | |
|---|---|---|---|
| 1,072,660 | 9/1913 | Shore | 148/19 |
| 2,520,334 | 8/1950 | Peters | 148/16.5 |
| 3,255,005 | 6/1966 | Green | 148/187 X |
| 3,578,470 | 5/1971 | Bohat et al. | 106/52 |

OTHER PUBLICATIONS
Metals Handbook, 1948 Edition, p. 693.
Metals Handbook, 1964, Vol. 2, 8th Ed., pp. 110 & 111.

*Primary Examiner*—C. Lovell
*Attorney, Agent, or Firm*—Craig & Antonelli

[57] ABSTRACT

A method for case-hardening workpieces which is characterized in that certain areas at the workpiece are protected against excessive case-hardening depths by means of a cover body consisting of glass ceramic; for case-hardening transmission gears provided with shifting teeth of weaker cross section, the cover body consists of a ring with a cylindrical portion and a ring disk-shaped portion.

10 Claims, 2 Drawing Figures

METHOD FOR CASE HARDENING WORKPIECES

The present invention relates to a method for the case-hardening of workpieces, especially in continuous gas-carburization installations, in which predetermined areas, for example, areas of weaker cross section are protected by a coating or covering against excessive case-hardening depth.

In order to protect certain areas in workpieces against an excessive carburizing, it is known to protect these certain areas by the application of special insulating pastes. This prior art method requires numerous operating steps, does not produce in every case reproducable results and is suitable only for a carburization in powder form, but is not suitable to the application of continuous gas-carburization installation.

It has now been discovered in a surprising manner that the described difficulties can be overcome if, according to the present invention, the predetermined areas to be covered at the workpiece are protected by a protective covering body consisting of glass ceramics machinable with conventional work tools.

Any desired form and shape may be imparted to a cover body made of glass ceramic material by means of conventional work tools and machines as are used for metal working and machining. The glass ceramic material does not absorb any carbon, it remains stable in its given shape and is re-usable repeatedly. The poor thermal conductivity of glass ceramic material results favorably influencing the cooling off velocity during the hardening. The covering by means of a cover body can be undertaken considerably more rapidly than an application of a paste. A gain in time also results during the removal of the cover body. Therebeyond, one is no longer dependent on the conscientiousness of the worker, by which may be influenced the work product. The high heat resistance of glass ceramic material and its capability to endure also over long periods of time, the sudden temperature drops which occur during the hardening are additionally advantageous.

A cover body of glass ceramics for covering shifting teeth of weak cross section at a transmission gear may consist in a simple manner of a ring with a cylindrical portion and a ring disk-shaped portion. Furthermore, this ring may be provided with teeth engaging into the shifting teeth to be covered so that the gas flow or circulation between the teeth of the shifting tooth arrangement is braked and a leaning (reduction of the gas potential) ensures a lesser carburization.

Accordingly, it is an object of the present invention to provide a method for case-hardening of workpieces which avoids by simple means the aforementioned shortcomings and drawbacks encountered in the prior art.

Another object of the present invention resides in a method for case-hardening workpieces which permits a more efficient operation with greater reliability for reproducable results.

A further object of the present invention resides in a method for case-hardening workpieces which eliminates the hazards of varied results due to human errors.

Still another object of the present invention resides in a method for case-hardening workpieces which can be applied readily to gas-carburization utilizing continuously operating installations in which the workpieces to be case-hardened are continuously moving through the heating installation.

Still another object of the present invention resides in a method for case-hardening workpieces which permits the use of a protective member that can be re-used repeatedly.

Figure 2:
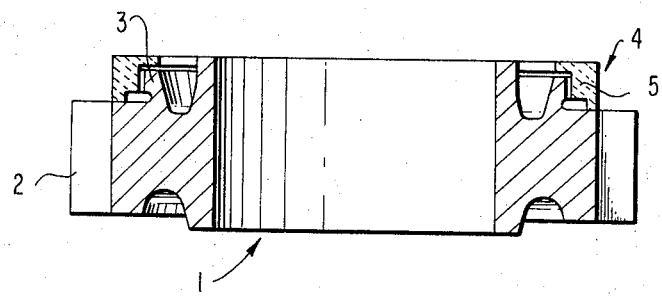

These and other objects, features and advantages of the present invention will become more apparent from the following description when taken in connection with the accompanying drawing which shows, for purposes of illustration only, two embodiments in accordance with the present invention, and wherein:

FIG. 1 is a cross-sectional view through a transmission gear provided with a cover body of glass ceramics in accordance with the present invention for covering the shifting teeth; and FIG. 2 is a cross-sectional view through a modified embodiment of a cover body of glass ceramics in accordance with the present invention for covering the shifting teeth on a transmission gear.

Referring now to the drawing wherein like reference numerals are used throughout the two views to designate like parts, and more particularly to FIG. 1, reference numeral 1 generally designates in this figure a transmission gear which is provided with a helical or inclined toothed arrangement 2 and with a shifting tooth arrangement 3 of weaker cross section.

In order to avoid a breaking out of the shifting teeth 3 during operation, the case hardening depth and the core strength has to be smaller during the hardening of the transmission gear 1 within the area of the shifting teeth 3 than in the area of the helical or inclined teeth 2 representing the main teeth. For achieving a lesser case-hardening depth and smaller core strength, the shifting tooth arrangement 3 is covered off by means of a ring generally designated by reference numeral 4 which includes a cylindrical portion 4a and a ring disk-shaped portion 4b. The ring consists of conventional glass ceramics which do not absorb any carbon, have a poor thermal conductivity, can be machined and are re-usable repeatedly also for the same purpose. It is possible by the covering of the shifting teeth 3 by means of the ring 4 to undertake the case-hardening of the transmission gear 1 in a continuous gas-carburization installation of conventional type.

In the case of the embodiment according to FIG. 2, the ring generally designated by reference numeral 4 and consisting also of a glass ceramic material is provided with a toothed arrangement 5 which upon emplacement of the ring 4 over the shifting teeth 3, engages into the tooth gap of this toothed arrangement. The gas circulation through the tooth gaps of the shifting tooth arrangement 3 is braked or reduced by this toothed arrangement 5 and a gas leaning is attained thereby.

In an advantageous manner, glass ceramics may be used which have a specific weight of about 2.54 g/cm$^3$, a tensile strength of approximately 600 kg/cm$^2$, at a temperature of 25°C., a shearing strength of approximately 240 kg/cm$^2$, a linear coefficient of expansion of approximately 63 × 10$^{-7}$/°C. during a heating from about 25°C. to about 400° C., a thermal conductivity of about 3.1 Kcal/sec·cm·°C., and a heat resistance up to 1,200° C.

Material usable as glass ceramic which has the aforementioned or similar characteristics is commercially available at present. Typical materials suitable with the present invention are glass ceramics commercially available from Corning Glass Works, Corning, New York 14830, for example, the glass ceramic Code 9656, which is described in the brochure entitled "THE MACHINABLES—A New Family of Glass Ceramics from Corning" by CORNING, Corning Glass Works, Corning, New York 14830 (MGC 1-2-71).

While I have shown and described two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A method for case-hardening workpieces in which predetermined areas of the workpieces are protected against an excessive case-hardening depth by a cover body, said method comprising placing on a workpiece an integral already-formed cover body shaped to correspond with the portion of the workpiece to be protected and thereafter case-hardening said workpiece by means of a gas-carburization installation; said cover body being formed of a glass ceramic having a specific weight of about 2.54 g/cm$^3$, a tensile strength at a temperature of about 25°C of approximately 600 kg/cm$^2$, a shearing strength of about 240 kg/cm$^2$, a linear coefficient of expansion of about $63 \times 10^{-7}$/°c during a heating from about 25°C to about 400°C, a thermal conductivity at 25°C of about 3.1 Kcal/sec.cm.°C, and a heat resistance of up to about 1,200°C.

2. A method according to claim 1 wherein said workpieces are gears, each gear being provided with a main tooth arrangement and a shifting tooth arrangement the teeth in said shifting tooth arrangement having weaker cross-sections than the teeth in said main tooth arrangement, said cover body being shaped and sized to protect said shifting tooth arrangement but not said main tooth arrangement when said cover body is placed on said gear.

3. A method according to claim 2 wherein said cover body comprises a ring with a cylindrical portion and a ring disc-shaped portion.

4. A method according to claim 3 wherein said cover body is composed of a disc having a concentric opening therein and a cylindrical ring concentric with and attached to the outer periphery of said disc.

5. A method according to claim 4 wherein said cover body further defines tooth means adapted to engage the gaps between the teeth in said shifting tooth arrangement when said cover body is placed on said gear.

6. A method according to claim 5 wherein said cover body is sized and shaped to allow a small distance between said cover body and the teeth in said shifting tooth arrangement when said cover body is placed on said gear, whereby carburizing gas is allowed to come into contact with the surfaces of the teeth of said shifting tooth arrangement during carburization.

7. A method according to claim 4 wherein said cover body is sized and shaped to allow a small distance between said cover body and the teeth in said shifting tooth arrangement when said cover body is placed on said gear, whereby carburizing gas is allowed to come into contact with the surfaces of the teeth of said shifting tooth arrangement during carburization.

8. A method according to claim 4 further comprising removing said cover body from said gear after carburization of said gear, placing said cover body on a second gear, and carburizing said second gear in a gas-carburization installation.

9. A method according to claim 2 further comprising removing said cover body from said gear after carburization of said gear, placing said cover body on a second gear, and carburizing said second gear in a gas-carburization installation.

10. A method according to claim 1 further comprising removing said cover body from said workpiece after carburization of said workpiece, placing said cover body on a second workpiece, and carburizing said second workpiece in a gas-carburization installation.

* * * * *